United States Patent Office 3,343,507
Patented Sept. 26, 1967

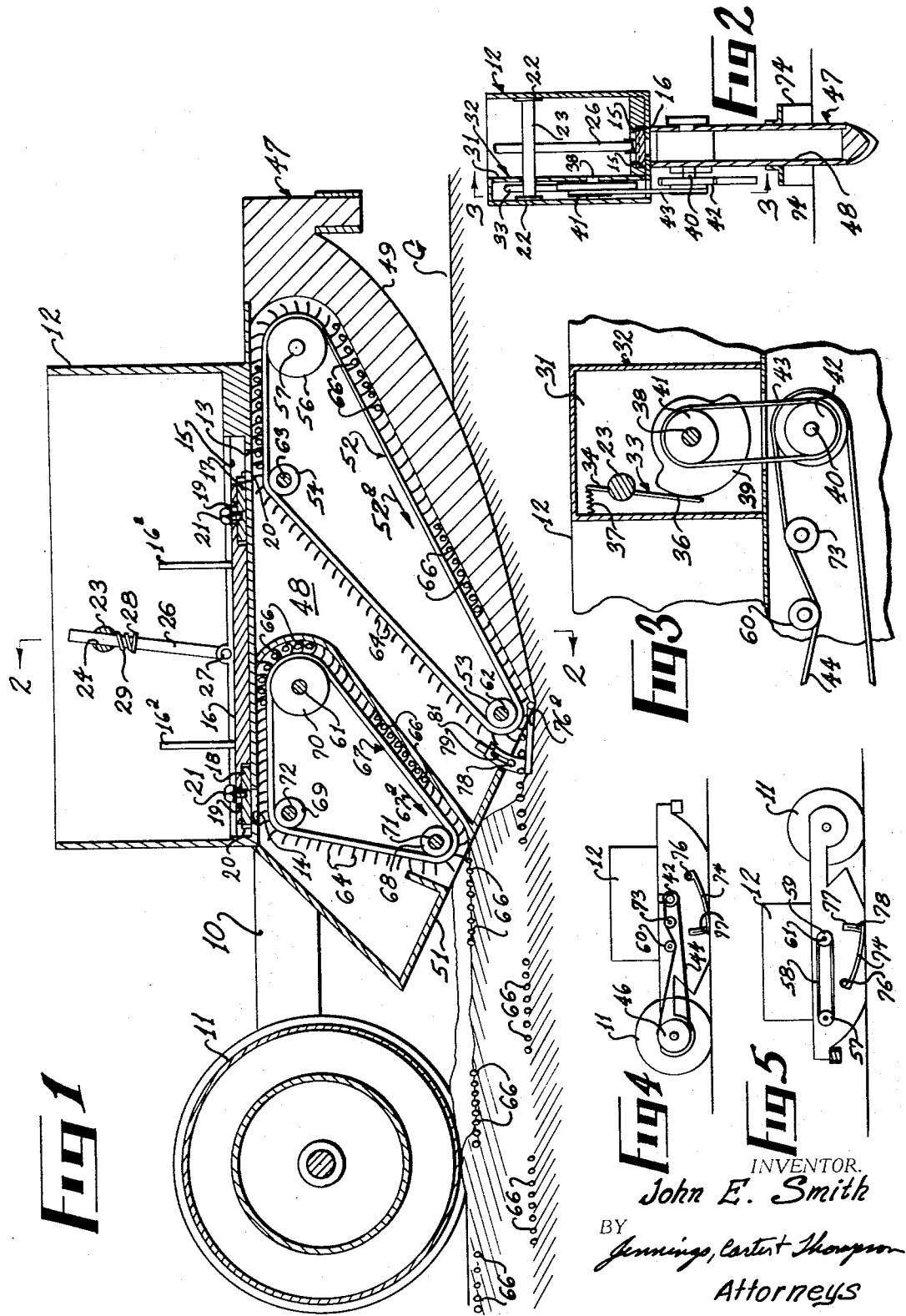

3,343,507
PLANTER
John E. Smith, Joppa, Ala., assignor of twenty-five percent to James R. Goodlett, Joppa, Ala.
Filed May 11, 1965, Ser. No. 454,824
5 Claims. (Cl. 111—73)

ABSTRACT OF THE DISCLOSURE

A seed planter having a receptacle with seed discharge openings that are alternately opened and closed. A depending housing having an upwardly and rearwardly sloping rear portion communicates with the receptacle and passes beneath the surface of the soil. Endless conveyor units within the depending housing transfer seed to separate locations and at separate elevations adjacent the upwardly and rearwardly sloped portion.

---

This invention relates to a planter and more particularly to a planter which is adapted to plant seed at different elevations while making a single pass over the ground.

An object of my invention is to provide a planter for planting seed beneath the surface of soil which shall include means to alternately discharge seed first through one discharge opening and then another whereby the seed are distributed in alternate streams and at different elevations, thus assuring that one stream of seed is not distributed directly above another stream thereof.

Another object of my invention is to provide a planter of the character designated in which alternate streams of seed are conveyed to locations at a predetermined depth beneath the soil and the other streams are conveyed to other locations rearwardly of and at an elevation above the first mentioned locations whereby the depth that the seed are planted may be accurately controlled.

A further object of my invention is to provide a planter of the character designated which shall include improved means for varying the amount of seed discharged as well as the elevation at which the seed are discharged.

A still further object of my invention is to provide a planter for planting seed beneath the surface of soil which shall be simple of construction, economical of manufacture and one which may be connected to conventional type farm machinery, such as a tractor or the like.

Heretofore in the art to which my invention relates, difficulties have been encountered in obtaining a good stand of crops, such as cotton and the like, due to the fact that seed should be planted at a lower elevation during dry seasons and at a higher elevation during wet seasons. Since the farmer cannot predict with accuracy whether or not he will have a wet season or dry season, he either plants the seed at a shallow elevation or at a deeper elevation. In the event he plants at a shallow elevation and a dry season follows, the seed fail to sprout. On the other hand, if he plants at a deeper elevation and a rainy season follows, the ground is compacted whereby the young plants will not penetrate the deep layer of soil.

To overcome the above and other difficulties, I provide a planter wherein alternate streams of seed are planted at an elevation adjacent the surface of the ground and at a deeper elevation. I also provide means for adjusting the elevation at which the seed are planted at both elevations, together with means to vary the rate at which the seed are discharged.

Apparatus embodying features of my invention is illustrated in the accompanying drawing, forming a part of this application, in which:

FIG. 1 is a vertical sectional view through the planter showing the seed being planted at two different elevations;

FIG. 2 is a view taken generally along the line 2—2 of FIG. 1 and drawn to a slightly smaller scale;

FIG. 3 is an enlarged, fragmental view taken generally along the line 3—3 of FIG. 2;

FIG. 4 is a side elevational view, drawn to a small scale, showing the means for transmitting power from a ground engaging member to the planter and the means for adjusting the elevation at which the planter penetrates the soil; and, FIG. 5 is a side elevational view showing the opposite side of the planter from that shown in FIG. 4.

Referring now to the drawing for a better understanding of my invention, I show a translatable frame 10 having a ground engaging wheel 11 adjacent the rear end thereof. Mounted on the frame 10 forwardly of the wheel 11 is a receptacle 12 for receiving the seed to be planted. Spaced apart discharge openings 13 and 14 are provided in the bottom of the receptacle 12 in position to discharge seed from the receptacle at spaced apart points.

Mounted for sliding movement within the receptacle 12 and guided in slots 15 is a baffle member 16 which is adapted to move alternately over the discharge opening 13 and the discharge opening 14 to thereby alternately open and close the discharge openings whereby the seed are first discharged from one opening and then the other. To vary the rate at which the seed are discharged through the openings 13 and 14, adjustable members 17 and 18 are carried by opposite ends of the baffle 16 in position to vary the effective size of the openings 13 and 14, respectively. Elongated slots 19 are provided in the baffle member 16 adjacent each end thereof in position to receive a wing screw 21 which is in threaded engagement with the subjacent member 17 or 18, as the case may be. Accordingly, the position of the movable members 17 and 18 may be readily adjusted relative to the baffle member 16 by merely releasing the wing screws 21. After being adjusted, the movable members 17 and 18 are held in fixed positions by the wing screws 21. The front or outermost portions of members 17 and 18 may be slightly concave as at 20 whereby the slots 15 are cleared of any obstructions, such as seed or trash. Upstanding spikes 16ª may be carried by the baffle member 16 to impart agitation to the seed.

In the drawings I shown one method of imparting oscillating motion to the baffle 16. Extending transversely of the receptacle 12 and mounted for rotation in suitable bearings 22 carried by the receptacle 12 is a shaft 23. An opening 24 is provided through the shaft 23 for receiving the upper end of a lever arm 26 with a sliding fit. The lower end of lever arm 26 is pivotally connected to the baffle member 16 by a pivot pin 27 whereby upon oscillation of the shaft 23, the arm 26 and the baffle member 16 carried thereby are also oscillated. A spring abutment 28 is carried by the arm 26 beneath the shaft 23, as shown in FIG. 1. Surrounding the arm 26 intermediate the shaft 23 and the spring abutment 28 is a compression spring 29 which urges the lever arm 26 toward the baffle member 16.

As shown in FIG. 2, the receptacle 12 is provided with a vertical partition 31 which separates the seed receptacle from a laterally disposed housing 32 for receiving power transmitting means for the shaft 23. Extending through the shaft 23 within the housing 32 is an actuating rod 33 having an upwardly extending end 34 and a depending end 36. A tension spring 37 is interposed between a side wall of the housing 32 and the upper end 34 of the actuating member 33, as shown in FIG. 3 whereby the shaft 23 is urged in a counterclockwise direction, as viewed in FIG. 3. Mounted for rotation within the housing 32 subjacent the shaft 23 is a short shaft 38. Mounted on the shaft 38 is a cam member 39 which is adapted to engage the depending lower end 36 of the actuating member 33 whereby upon rotation of the cam 39, the shaft 23 is oscillated. Mounted on the shaft 38 adjacent the cam 39 is a pulley or sprocket 41 which is driven from a pulley or sprocket 42 by a suitable flexible drive member 43. The pulley or sprocket 42 is carried by a shaft 40 and is driven by a flexible member 44, such as a belt, chain or the like, which in turn is driven by a pulley or sprocket 46 carried by the ground engaging wheel 11.

Mounted on the translatable frame beneath the receptacle 12 is a depending housing 47 having a relatively narrow, vertically extending chamber 48 therein. The forward edge 49 of the housing 47 is tapered forwardly to present a relatively sharp forward end for the housing. The lower rearmost portion of the housing 47 slopes upwardly and rearwardly as at 51, shown in FIG. 1, whereby the soil is free to move inwardly by gravity and cover the seed deposited adjacent the rear end of the tapered edge 49. The housing 47 holds the soil outwardly of the seed receiving furrow until the seed are deposited at the lower elevation.

Mounted for rotation within the housing 47 subjacent the seed discharge opening 13 is an endless conveyor unit or belt 52. The belt is supported by suitable pulleys or sprockets 53, 54 and 56, as shown in FIG. 1. The pulley or sprocket 56 is secured non-rotatably to a shaft 57 which in turn is driven by an endless flexible member 58 which passes around a pulley or sprocket 59 mounted on a shaft 61. The pulley or sprockets 53 and 54 are mounted on shafts 62 and 63, respectively. The endless conveyor 52 is provided with equally spaced flights 64 which project outwardly therefrom in position to support the seed 66 as they are transferred downwardly and rearwardly as indicated by the arrow 52$^a$.

Mounted subjacent the seed discharge opening 14 and within the housing 47 is a second endless conveyor unit 67 which is also provided with the outwardly projecting flights 64 which support the seed 66 as they are conveyed downwardly and rearwardly as indicated by the arrow 67$^a$. The conveyor unit 67 is supported by pulleys or sprockets 68, 69 and 70, as shown in FIG. 1. The pulleys or sprockets 68 and 69 are mounted on shafts 71 and 72, respectively. Mounted on the shaft 61, outwardly of the housing 47, as shown in FIG. 3, is a pulley or sprocket 73 which engages flexible drive member 44 whereby rotary motion is imparted to shaft 61 upon rotation of the ground engaging member 11. An idler 60 may be provided to control the tension of the drive member 44.

The depth at which the housing 47 penetrates the ground is controlled by depth gauges 74 which are pivotally mounted at each side of the depending housing 47 by suitable pivot pins 76. The rear ends of the depth gauges 74 are held in selected positions by providing arcuate slots 77 in the housing 47 in position to receive suitable wing nuts 78 whereby the rear ends of the depth gauges 74 are held at selected elevations. Accordingly, the elevation at which the depth gauges 74 are set determines the elevation at which the seed are discharged from the conveyor unit 67 into the soil G. After the seed are deposited in the soil, the ground engaging wheel 11 causes the soil to be urged inwardly over the seed.

The elevation at which the seed are discharged from the conveyor unit 52 may be adjusted by a rearwardly extending baffle member 76$^a$ which is held in selected positions by a wing nut 78 which in turn passes through an elongated slot 79 carried by an arcuate bracket 81.

From the foregoing description, the operation of my improved planter will be readily understood. As the ground engaging wheel 11 rotates, the flexible drive member 44 rotates the shafts 40 and 61 whereupon rotary motion is imparted to the conveyor unit 67 and the cam member 39. Since the shaft 61 is connected in driving relation with the shaft 57 by the flexible member 58, rotary motion is also imparted to the conveyor unit 52. Accordingly, as the conveyor units 52 and 67 move relative to the openings 13 and 14, the baffle member 16 is oscillated back and forth by the arm 26 which in turn is operatively connected to the cam member 39 by the shaft 23 and the actuating member 33. The length of the flight of the conveying unit 67 intermediate the sprockets 68 and 70 is approximately one-half the length of the flight of the conveyor unit 52 between the sprockets 53 and 56. Also the upper flights of both conveyors are substantially equal in length. It will thus be seen that by alternately depositing seed on the conveyor units 52 and 67, the seed will be alternately deposited at spaced intervals in the soil and at different elevations, as clearly shown in FIG. 1. As the housing 47 passes through the soil G, the soil falls in over the seed 66 deposited at the lower elevation. As pointed out above, the elevation at which the seed are deposited in the soil from the conveyor unit 52 is controlled by the position of the adjustable baffle 76$^a$. By employing the rearwardly and upwardly extending portion 51, the seed 66 at the lower elevation are thus covered as the soil, which was moved outwardly by the forward portion of housing 47, falls by gravity into the open space below the upwardly extending portion 51, as shown in FIG. 1. That is, the forward portion of the housing 47 is relatively narrow, as shown in FIG. 2, whereby it makes a deep narrow furrow in the ground, the lower portion of which is covered immediately by a portion of the soil as it returns by gravity to the furrow just made prior to deposit of the upper stratum of seed.

The elevation of the upper stratum of seed and the overall depth that the housing 47 penetrates the soil is controlled by the depth gauges 74 mounted at each side of the housing 47. After the seed 66 have been delivered to the soil by the conveyor unit 67, the ground engaging wheel 11 causes the soil to cover the seed the desired depth. In view of the fact that ground engaging wheels 11 employed on planters to cover seed are well known in the art, no further description thereof is deemed necessary.

The shafts 57, 62 and 63 which support the conveyor unit 52 may be adjusted in horizontal and vertical directions by suitable means to maintain the proper tension on the endless conveyor unit. Also, suitable means may be employed to adjust the horizontal and vertical positions of the shafts 61, 71 and 72 of the conveyor unit 67. Since the means for varying the tension on the conveyor units 52 and 67 forms no part of my present invention and such means is well known in the art, no further description thereof is deemed necessary.

From the foregoing, it will be seen that I have devised an improved planter for planting seed in alternate stratums at different elevations whereby one stratum of seed is adapted to sprout and grow in the event there is a dry season and the other stratum of seed is adapted to sprout and grow in the event there is a wet season. By providing a pair of conveyor units adapted to deliver the seed at different elevations, together with means alternately regulating the flow of seed onto the conveyor units, all of the movable parts of the apparatus are connected in driving relation with and synchronized with rotation of the ground engaging wheel whereby the seed are deposited at the same rate into the soil regardless of the speed at which the planter travels relative to the soil G.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. In a planter for planting seed beneath the surface of soil:
   (a) a translatable frame having at least one ground engaging wheel thereon, (b) a receptacle on said frame for holding seed to be planted,
(c) a pair of seed discharge openings in said receptacle,
(d) means to alternately open and close said discharge openings whereby seed are first discharged from one opening and then the other,
(e) a housing carried by said frame and depending from said receptacle with the lower end of said housing being adapted to pass beneath the surface of the soil and having a lower rearmost portion which slopes upwardly and rearwardly,
(f) a first endless conveyor unit within said depending housing and disposed to convey seed discharged from one of said discharge openings to a first location of a predetermined depth beneath the soil adjacent the lower end of said upwardly and rearwardly sloped portion,
(g) a second endless conveyor unit within said depending housing and disposed to convey seed discharged from the other of said discharge openings to a second location along said upwardly and rearwardly sloped portion rearwardly of and at an elevation above said first location, and
(h) power transmitting means operatively connecting said ground engaging wheel to said first and second endless conveyor units and to said means to alternately open and close said discharge openings.

2. In a planter for planting seed beneath the surface of soil as defined in claim 1 in which a rearwardly extending adjustable baffle is mounted adjacent the lower end of said upwardly and rearwardly sloped portion to vary the elevation at which the seed are discharged at said first location.

3. In a planter for planting seed beneath the surface of soil as defined in claim 1 in which the means to alternately open and close said discharge openings comprises:
(a) a movable baffle mounted for sliding movement relative to said openings,
(b) an upstanding arm pivotally connected at its lower end to said movable baffle,
(c) a shaft extending transversely of said receptacle,
(d) means operatively connecting said shaft to said upstanding arm whereby said arm is oscillated upon oscillation of said shaft, and
(e) means operatively connecting said shaft to said power transmitting means.

4. In a planter for planting seed beneath the surface of soil as defined in claim 3 in which the means operatively connecting said shaft to said power transmitting means comprises:
(a) a depending member carried by said shaft outwardly of said receptacle, and
(b) a cam member disposed to engage said depending member whereby said depending member and the shaft connected thereto is oscillated.

5. In a planter for planting seed beneath the surface of soil as defined in claim 4 in which the cam member is driven by a rotatable member which in turn is connected in driving relation to said ground engaging wheel.

References Cited

UNITED STATES PATENTS

| | | | |
|---|---|---|---|
| 307,015 | 10/1884 | Chapuis | 111—73 X |
| 595,187 | 12/1897 | Mahon et al. | 111—73 |
| 628,362 | 7/1899 | Sheppard | 111—73 |
| 876,538 | 1/1908 | Gardner | 111—73 X |
| 1,291,164 | 1/1919 | Royer | 111—80 |
| 1,362,834 | 12/1920 | Barfield | 111—80 |
| 2,889,788 | 6/1959 | Van Dorn | 111—73 X |
| 3,176,636 | 4/1965 | Wilcox et al. | 111—51 |

ABRAHAM G. STONE, *Primary Examiner.*

A. E. KOPECKI, *Assistant Examiner.*